United States Patent
Michel et al.

(10) Patent No.: US 11,108,688 B2
(45) Date of Patent: Aug. 31, 2021

(54) ENHANCED USE OF A SWITCHING FABRIC WITHIN A CENTRAL OFFICE POINT OF DELIVERY OF A BROADBAND ACCESS NETWORK OF A TELECOMMUNICATIONS NETWORK

(71) Applicant: DEUTSCHE TELEKOM AG, Bonn (DE)

(72) Inventors: Carsten Michel, Hochheim (DE); Thomas Haag, Rodgau (DE); Hans-Joerg Kolbe, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 16/479,978

(22) PCT Filed: Feb. 6, 2018

(86) PCT No.: PCT/EP2018/052971
§ 371 (c)(1),
(2) Date: Jul. 23, 2019

(87) PCT Pub. No.: WO2018/149702
PCT Pub. Date: Aug. 23, 2018

(65) Prior Publication Data
US 2019/0342206 A1    Nov. 7, 2019

(30) Foreign Application Priority Data

Feb. 15, 2017  (EP) .................................... 17156255

(51) Int. Cl.
*H04L 12/723*  (2013.01)
*H04L 12/947*  (2013.01)
(Continued)

(52) U.S. Cl.
CPC .............. *H04L 45/50* (2013.01); *H04L 49/25* (2013.01)

(58) Field of Classification Search
CPC ................................ H04L 45/50; H04L 49/25
(Continued)

(56) References Cited

U.S. PATENT DOCUMENTS 10,097,372 B2 * 10/2018 Bhattacharya ........ H04L 45/745
2012/0099861 A1    4/2012 Zheng
(Continued)

FOREIGN PATENT DOCUMENTS

| CN | 101645836 A | 2/2010 |
|----|-------------|--------|
| CN | 101931548 A | 12/2010 |
| CN | 103460061 A | 12/2013 |

OTHER PUBLICATIONS

Saurav Das, "CORD: FABRIC An Open—Source Leaf—Spine L3 Clos Fabric", Jun. 2015. (Year: 2015).*
(Continued)

*Primary Examiner* — Yemane Mesfin
*Assistant Examiner* — Intekhaab A Siddiquee
(74) *Attorney, Agent, or Firm* — Leydig, Voit & Mayer, Ltd.

(57) ABSTRACT

A method for enhanced use of a switching fabric within a central office point of delivery of a broadband access network of a telecommunications network includes: transporting data packets to or from a specific remote access node using a pseudo wire, wherein the pseudo wire spans at least the specific remote access node and the switching fabric. Using the pseudo wire comprises using first header label information for a data packet to be received by the specific remote access node and using second header label information for a data packet sent from the specific remote access node. Segment routing of the data packets is used involving third header label information for the data packet to be received by the specific remote access node and involving fourth header label information for the data packet sent from the specific remote access node.

8 Claims, 2 Drawing Sheets

(51) Int. Cl.
*H04L 12/721* (2013.01)
*H04L 29/08* (2006.01)
*H04L 12/753* (2013.01)

(58) Field of Classification Search
USPC .......................................................... 370/392
See application file for complete search history.

(56) References Cited

U.S. PATENT DOCUMENTS

2012/0147737 A1   6/2012  Taylor et al.
2015/0207724 A1*  7/2015  Choudhury ............. H04L 45/42
                                                            370/255

OTHER PUBLICATIONS

Clarence Filsfils and Kris Michielsen, "Segment Routing Co-existence with LDP". (Year: 2015).*
RFC 6658 (Year: 2012).*
Saurav Das et al: "CORD: FABRIC An Open—Source Leaf—Spine L3 Clos Fabric ONF Operator Member Survey", Feb. 6, 2015 (Feb. 6, 2015), XP055382841, pp. 1-16.
Saurav Das etal: "CORD Design Notes; CORD Fabric, Overlay Virtualization, and Service Composition", Mar. 1, 2016 (Mar. 1, 2016), XP055382842, pp. 1-11.
Saurav Das, et al., "CORD Fabric, Overlay Virtualization, and Service Composition" CORD Design Notes, Mar. 1, 2016, pp. 1-11, Open Networking Foundation, California, USA.

* cited by examiner

Fig. 4

ENHANCED USE OF A SWITCHING FABRIC WITHIN A CENTRAL OFFICE POINT OF DELIVERY OF A BROADBAND ACCESS NETWORK OF A TELECOMMUNICATIONS NETWORK

CROSS-REFERENCE TO RELATED APPLICATIONS

This application is a U.S. National Phase application under 35 U.S.C. § 371 of International Application No. PCT/EP2018/052971, filed on Feb. 6, 2018, and claims benefit to European Patent Application No. EP 17156255.6, filed on Feb. 15, 2017. The International Application was published in English on Aug. 23, 2018 as WO 2018/149702 A1 under PCT Article 21(2).

FIELD

The present invention relates a method for enhanced use of a switching fabric within a central office point of delivery of a broadband access network of a telecommunications network, wherein the switching fabric comprises a plurality of spine network nodes and a plurality of leaf network nodes.

Furthermore, the present invention relates to a telecommunications network for enhanced use of a switching fabric within a central office point of delivery of a broadband access network of the telecommunications network, wherein the switching fabric comprises a plurality of spine network nodes and a plurality of leaf network nodes.

Additionally, the present invention relates to a logical or physical central office point of delivery for enhanced use of a switching fabric within the central office point of delivery of a broadband access network of a telecommunications network, wherein the switching fabric comprises a plurality of spine network nodes and a plurality of leaf network nodes.

Additionally, the present invention relates to a system for enhanced use of a switching fabric within a central office point of delivery of a broadband access network of a telecommunications network, the system comprising at least the central office point of delivery, wherein the switching fabric comprises a plurality of spine network nodes and a plurality of leaf network nodes.

Furthermore, the present invention relates to a program and a computer program product for enhanced use of a switching fabric within a central office point of delivery of a broadband access network of a telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of aggregation networks linking remote or central access nodes to the edge of a backbone network or core network of the telecommunications network, in order to provide network access to client devices being connected to the telecommunications network. Typically, such client devices use a network connectivity link provided by a customer premises equipment device that connects the client device to a central office point of delivery of the telecommunications network.

Presently, a common architecture for switching line termination nodes to a service edge (node) is to use a fabric using layer 2 technology like VxLAN (Virtual Extensible LAN (local area network)) to interconnect devices (or network nodes) within this fabric architecture. This limits the amount of connections within a fabric to a number of 4094. Furthermore it is difficult or simply not possible, based on technology available today, to stack in order to enable double tagged access ports to be connected transparently to the service edge. Currently, such solutions typically require a centralized controller to manage all connections within a typical fabric. Another approach would be to use layer 3 based MPLS (Multiprotocol Label Switching) protocol. This supports layer 3 traffic mainly, but most access technologies are layer 2 based.

The different layers mentioned in the context of the present invention refer to the different layers of the OSI model (Open Systems Interconnection model), mainly layer 2 (data link layer), and layer 3 (network layer). The data link layer provides node-to-node data transfer such as a link between two directly connected nodes. It detects and possibly corrects errors that may occur in the physical layer. Among other things, it defines the protocol to establish and terminate a connection between two devices being physically connected, either directly or indirectly. It also defines the protocol for flow control between them. The network layer provides the functional and procedural elements of transferring variable length data sequences (called datagrams or data packets) from one network node to another.

SUMMARY

In an exemplary embodiment, the present invention provides a method for enhanced use of a switching fabric within a central office point of delivery of a broadband access network of a telecommunications network. The switching fabric comprises a plurality of spine network nodes and a plurality of leaf network nodes, wherein—within the switching fabric—each one of the plurality of spine network nodes is connected with each one of the plurality of leaf network nodes. The central office point of delivery further comprises a plurality of line termination nodes and/or service edge nodes. The broadband access network comprises a plurality of remote access nodes such that each one of the plurality of line termination nodes is connected to at least one of the plurality of remote access nodes. The telecommunications network furthermore comprises a plurality of edge nodes such that each one of the plurality of spine network nodes is connected to at least one of the plurality of edge nodes. The method comprises: transporting data packets to or from a specific remote access node of the plurality of remote access nodes using a pseudo wire, wherein the pseudo wire spans at least the specific remote access node and the switching fabric. Using the pseudo wire comprises using first header label information for a data packet to be received by the specific remote access node and using second header label information for a data packet sent from the specific remote access node. In order to transport the data packets across the switching fabric, segment routing—using multi protocol label switching—of the data packets is used involving third header label information for the data packet to be received by the specific remote access node and involving fourth header label information for the data packet sent from the specific remote access node.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a technically simple, effective and cost effective solution for enhanced use of a switching fabric within a central office point of delivery of a broadband access network of a telecommunications network, wherein the switching fabric comprises a plurality of spine network nodes and a plurality of leaf network nodes. Exemplary embodiments of the present invention further provide a corresponding telecommunications network, a corresponding user equipment, and a corresponding system comprising a telecommunications network, and the logical or physical central office point of delivery.

In an exemplary embodiment, the present invention provides a method for enhanced use of a switching fabric within a central office point of delivery of a broadband access network of a telecommunications network,
wherein the switching fabric comprises a plurality of spine network nodes and a plurality of leaf network nodes,
wherein—within the switching fabric considered—each one of the plurality of spine network nodes is connected with each one of the plurality of leaf network nodes,
wherein the central office point of delivery further comprises a plurality of line termination nodes and/or service edge nodes, and wherein the broadband access network comprises a plurality of remote access nodes such that each one of the plurality of line termination nodes is connected to at least one of the plurality of remote access nodes,
wherein the telecommunications network furthermore comprises a plurality of edge nodes such that each one of the plurality of spine network nodes is connected to at least one of the plurality of edge nodes,
wherein, in order to transport data packets to or from a specific remote access node of the plurality of remote access nodes, a pseudo wire is used, spanning at least the specific remote access node and the switching fabric, wherein the use of the pseudo wire comprises using a first header label information for a data packet received by the specific remote access node and using a second header label information for a data packet sent from the specific remote access node,
wherein, in order to transport the data packets across the switching fabric, segment routing—using multi protocol label switching—of the data packets is used involving a third header label information for a data packet received by the specific remote access node and using a fourth header label information for a data packet sent from the specific remote access node.

It is thereby advantageously possible according to the present invention to provide an architecture of the switching fabric comprising spine network nodes as well as leaf network nodes in order to connect the plurality of remote network nodes either to the service edge nodes inside the central office, or to the edge nodes outside the central office, typically label edge nodes, or to connect a network node inside the central office with an edge node outside the central office. Furthermore, it is advantageously possible to use a MPLS-based pseudo wire as service overlay to the MPLS segment routing based transport underlay.

It is advantageously possible according to the present invention, to provide for a pseudo wire extension to the remote access nodes, i.e. to the termination point of the connection (such as, e.g., MSANs (multi-service access nodes)) instead of the line termination nodes of the central office point of delivery within the broadband access network. According to the present invention, multi-segment pseudo wires comprising three segments may be used: a first segment from a remote access node (such as an MSAN (multi-service access nodes)) (of a plurality of remote access nodes) to the respective (i.e. connected) line termination node (such as an OLT (optical line termination node), typically located in the central office point of delivery (e.g., as part of the switching fabric); a second segment from the line termination node to the spine network node (or spine switch; typically as part of the switching fabric); and a third segment from the spine network node (or spine switch) to a termination point outside of the central office point of delivery.

According to the present invention, it is advantageously possible to provide a fabric architecture within the central office point of delivery, which supports Layer 2 based access systems in combination with LDP-based (Label Distribution Protocol) connectivity to remote nodes which are outside of the fabric (and hence outside of the central office point of delivery). This enables a flexible architecture by using basic MPLS (Multiprotocol Label Switching) features. It is preferred, according to the present invention, that an MPLS (Multiprotocol Label Switching) border gateway function establishes or enables pseudo wires to be generated to connect the line termination nodes (such as OLT, optical line termination nodes), the edge nodes (such as the LER (label edge routers)) and the remote access nodes like an MSAN (multi-service access node).

In contrast conventionally known approaches, such as the seamless MPLS approach, where LDP-DoD (Label Distribution Protocol Downstream on demand) is used to provide MPLS labels to the remote access node in a very simple way, the first segment mentioned above (i.e. the segment from the remote access node to the respective (i.e. connected) line termination node) is able to be realized without an LDP-DoD (Label Distribution Protocol Downstream on demand) mechanism, as it is simply a one hop segment and therefore no label is needed at all.

Furthermore according to the present invention—as the line termination node (such as an OLT, optical line termination node) and the remote access node (such as an MSAN, multi-service access node) are typically controlled by the same controller (or orchestrator) according to the present invention—, the same pseudo wire label can be used for layer-2 service on both devices, thereby simplifying the forwarding table on the line termination node dramatically. The line termination node now only has to push the node label (also known as a so-called SID-label or segment identification label) to the frame (i.e. to the data packet considered; in this case a data packet being transmitted or transported from the remote access node in upstream direction) and forward it to one of the leaf network nodes (or leaf switches) it is connected to.

Typically the remote access node is connected to customer premises equipment, and the customer premises equipment is typically connected to at least one client device. The client device can be any communication device such as a personal portable or desktop computing device, a (video or audio) streaming device, a television device, a smart phone, a tablet computing device, or any other device that is connectable either using a wireline or cable connection, or by using a wireless link such as a WLAN (wireless local area network) or WiFi connection, a Bluetooth connection or any other low range or cellular wireless access technology.

According to the present invention, it is advantageously possible to provide for an enhanced use of the switching fabric within the central office point of delivery. Typically, the switching fabric comprises a plurality of spine network nodes and a plurality of leaf network nodes, wherein each one of the plurality of spine network nodes is connected with each one of the plurality of leaf network nodes, and wherein, furthermore, the central office point of delivery comprises a plurality of line termination nodes. The remote access nodes of the broadband access network are connected to the line termination nodes of the central office point of delivery such that each one of the remote access nodes is connected to at least one line termination node, and such that each one of the line termination nodes is connected to at least one of the plurality of remote access nodes. According to the present invention, the telecommunications network furthermore comprises a plurality of (label) edge nodes such that each one of the plurality of spine network nodes is connected to at least one of the plurality of (label) edge nodes.

Data packets are either transmitted (or transported) in downstream direction, i.e. towards or to a considered remote access node (or a specific remote access node of the plurality of remote access nodes), or in upstream direction, i.e. from a considered (or specific) remote access node of the plurality of remote access nodes (and, e.g., to at least one (specific) line termination node which the considered remote access node is connected to).

For such transmission (or transport) of data packets, the present invention provides and uses a pseudo wire spanning at least the specific remote access node and the switching fabric. The use of the pseudo wire comprises using at least a first header label information for a data packet (being transported in downstream direction) received by the specific remote access node and using a second header label information for a data packet (being transported in upstream direction) sent from the specific remote access node. Furthermore, the present invention, in order to transport the data packets across the switching fabric, uses segment routing— using multi protocol label switching—of the data packets involving a third header label information for a data packet (being transported in downstream direction) received by the specific remote access node and using a fourth header label information for a data packet (being transported in upstream direction) sent from the specific remote access node.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Furthermore, it is advantageously possible and preferred according to the present invention that, in order to transport the data packets—being received by the specific remote access node or being sent from the specific remote access node—, the pseudo wire spans at least the specific remote access node, the switching fabric and a termination network node outside of the central office point of delivery, wherein the use of the pseudo wire comprises using at least a fifth header label information for a data packet (being transported in downstream direction) to be received by the specific remote access node and using a sixth header label information for a data packet (being transported in upstream direction) sent from the specific remote access node. According to preferred variants of the present invention, the use of the pseudo wire additionally comprises using a seventh header label information for a data packet (being transported in downstream direction) to be received by the specific remote access node and using an eighth header label information for a data packet (being transported in upstream direction) sent from the specific remote access node.

By using the pseudo wire for in order to transport the data packets—being received by the specific remote access node or being sent from the specific remote access node—and the pseudo wire spanning at least the specific remote access node, the switching fabric and a termination network node outside of the central office point of delivery, it is advantageously possible according to the present invention to use the pseudo wire for cases where the termination network node (outside of the central office point of delivery) corresponds to either a hierarchically higher location—compared to the central office point of delivery—within the telecommunications network (such as within the backbone or core network) or for cases where the termination network node corresponds to a hierarchically lower location—compared to the central office point of delivery—within the telecommunications network (such as another access node).

According to an alternative embodiment of the present invention, in order to transport the data packets—being received by the specific remote access node or being sent from the specific remote access node—, the pseudo wire spans the specific remote access node, and the switching fabric, wherein a termination network node of the pseudo wire is within the central office point of delivery.

Thereby, it is advantageously possible to use the pseudo wire also in cases where the pseudo wire connection is terminated within the switching fabric and/or the central office point of delivery.

It is to be understood that according to the present, it is advantageously possible that a plurality of pseud wires—being terminated at one and the same network node, such as one and the same (considered) remote access node—are able to be established and/or maintained and/or used at the same time.

According to a further preferred embodiment of the present invention, the broadband access network (such as the central office point of delivery or the switching fabric) comprises a controller node and/or a virtual router instance (which may be on the controller node), wherein the method comprises the following steps:

in a first step, in case that a data packet is to be received by the specific remote access node, the controller node and/or the virtual router instance assigns the first header label information and/or the third header label information to the pseudo wire, and in case that a data packet is to be sent from the specific remote access node, the controller node and/or the virtual router instance assigns the second header label information and/or the fourth header label information to the pseudo wire, in a second step, subsequent to the first step, the data packet is received by the specific remote access node or the data packet is sent from the specific remote access node.

Thereby, it is advantageously possible to implement the use of pseudo wires effectively and comparatively easily.

According to further embodiments of the present invention, the controller node and/or the virtual router instance is hosted by one or a plurality of spine nodes.

Thereby, it is advantageously possible to comparatively easily integrate the controller functionality within the switching fabric.

Furthermore, according to an embodiment of the present invention, segment identifiers are used as the third and fourth header label information within the switch fabric, wherein the segment identifiers may be unique identifiers within the switch fabric.

Thereby, it is advantageously possible to easily and effectively implement exemplary embodiments of the inventive method.

According to a further embodiment of the present invention, the pseudo wire provides a transparent layer-2 connection between the specific remote access node and the termination node outside of the central office point of delivery or within the central office point of delivery.

Furthermore, the present invention relates to a telecommunications network for enhanced use of a switching fabric within a central office point of delivery of a broadband access network of the telecommunications network, wherein the switching fabric comprises a plurality of spine network nodes and a plurality of leaf network nodes, wherein—within the switching fabric considered—each one of the plurality of spine network nodes is connected with each one of the plurality of leaf network nodes, wherein the central office point of delivery further comprises a plurality of line termination nodes and/or service edge nodes, and wherein the broadband access network comprises a plurality of remote access nodes such that each one of the plurality of line termination nodes is connected to at least one of the plurality of remote access nodes, wherein the telecommunications network furthermore comprises a plurality of (label) edge nodes such that each one of the plurality of spine network nodes is connected to at least one of the plurality of (label) edge nodes, wherein the telecommunications network is configured such that, in order to transport data packets to or from a specific remote access node of the plurality of remote access nodes, a pseudo wire is used, spanning at least the specific remote access node and the switching fabric, wherein the use of the pseudo wire comprises using a first header label information for a data packet received by the specific remote access node and using a second header label information for a data packet sent from the specific remote access node, wherein, in order to transport the data packets across the switching fabric, segment routing—using multi protocol label switching—of the data packets is used involving a third header label information for a data packet received by the specific remote access node and using a fourth header label information for a data packet sent from the specific remote access node.

Furthermore, the present invention relates to a logical or physical central office point of delivery for enhanced use of a switching fabric within the central office point of delivery of a broadband access network of a telecommunications network, wherein the switching fabric comprises a plurality of spine network nodes and a plurality of leaf network nodes, wherein—within the switching fabric considered—each one of the plurality of spine network nodes is connected with each one of the plurality of leaf network nodes, wherein the central office point of delivery further comprises a plurality of line termination nodes and/or service edge nodes, and wherein the broadband access network comprises a plurality of remote access nodes such that each one of the plurality of line termination nodes is connected to at least one of the plurality of remote access nodes, wherein the telecommunications network furthermore comprises a plurality of (label) edge nodes such that each one of the plurality of spine network nodes is connected to at least one of the plurality of (label) edge nodes, wherein the central office point of delivery is configured such that, in order to transport data packets to or from a specific remote access node of the plurality of remote access nodes, a pseudo wire is used, spanning at least the specific remote access node and the switching fabric, wherein the use of the pseudo wire comprises using a first header label information for a data packet received by the specific remote access node and using a second header label information for a data packet sent from the specific remote access node, wherein, in order to transport the data packets across the switching fabric, segment routing—using multi protocol label switching—of the data packets is used involving a third header label information for a data packet received by the specific remote access node and using a fourth header label information for a data packet sent from the specific remote access node.

Additionally, the present invention relates to a system for enhanced use of a switching fabric within a central office point of delivery of a broadband access network of a telecommunications network, the system comprising at least the central office point of delivery, wherein the switching fabric comprises a plurality of spine network nodes and a plurality of leaf network nodes, wherein—within the switching fabric considered—each one of the plurality of spine network nodes is connected with each one of the plurality of leaf network nodes, wherein the central office point of delivery further comprises a plurality of line termination nodes and/or service edge nodes, and wherein the broadband access network comprises a plurality of remote access nodes such that each one of the plurality of line termination nodes is connected to at least one of the plurality of remote access nodes, wherein the telecommunications network furthermore comprises a plurality of (label) edge nodes such that each one of the plurality of spine network nodes is connected to at least one of the plurality of (label) edge nodes, wherein the system is configured such that, in order to transport data packets to or from a specific remote access node of the plurality of remote access nodes, a pseudo wire is used, spanning at least the specific remote access node and the switching fabric, wherein the use of the pseudo wire comprises using a first header label information for a data packet received by the specific remote access node and using a second header label information for a data packet sent from the specific remote access node, wherein, in order to transport the data packets across the switching fabric, segment routing—using multi protocol label switching—of the data packets is used involving a third header label information for a data packet received by the specific remote access node and using a fourth header label information for a data packet sent from the specific remote access node.

Still additionally, the present invention relates to a program comprising a computer readable program code which, when executed on a computer and/or on a logical or physical central office point of delivery and/or on a network node of a switching fabric within a central office point of delivery, or in part on a logical or physical central office point of delivery and/or in part on a network node of a switching fabric within a central office point of delivery, causes the computer and/or the logical or physical central office point of delivery and/or the network node of a switching fabric within a central office point of delivery to perform exemplary embodiments of the inventive method.

Furthermore, the present invention relates to a computer program product for enhanced use of a switching fabric within a central office point of delivery of a broadband access network of a telecommunications network, the computer program product comprising a computer program stored on a storage medium, the computer program comprising program code which, when executed on a computer and/or on a logical or physical central office point of delivery and/or on a network node of a switching fabric within a central office point of delivery, or in part on a logical or physical central office point of delivery and/or in part on a network node of a switching fabric within a central office point of delivery, causes the computer and/or the logical or physical central office point of delivery and/or the network node of a switching fabric within a central office point of delivery to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
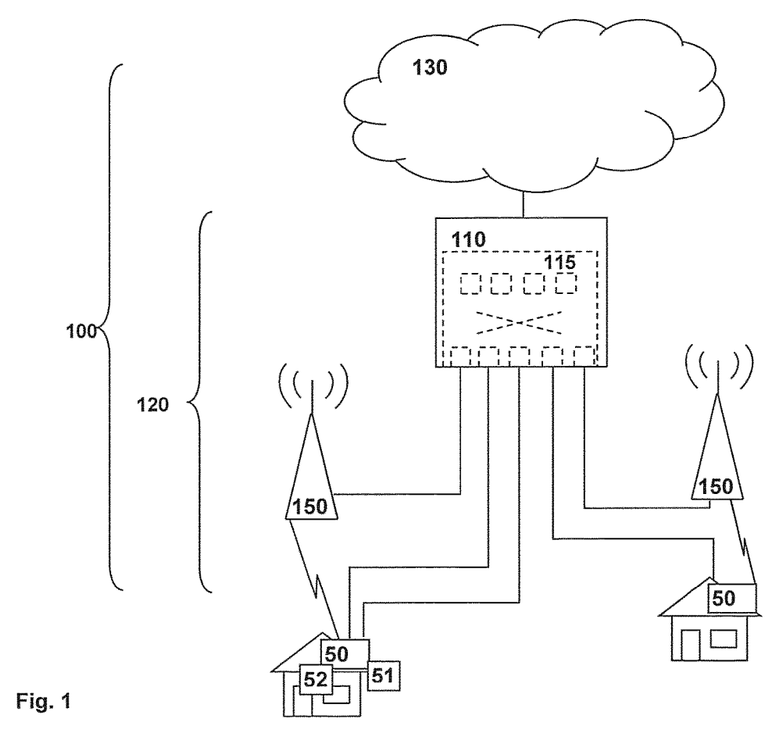
FIG. 1 schematically illustrates a telecommunications network according to the present invention, having a fixed line part and a mobile (or cellular) part, and, hence, providing the possibility for user equipment or client devices to use different access technologies, wherein the telecommunications network comprises a broadband access network, and wherein a logical or physical central office point of delivery (being part of the broadband access network) is handling different access possibilities.

In FIG. 1, a telecommunications network 100 according to the present invention is schematically shown, having—preferably—a fixed line part and a mobile (or cellular) part (schematically illustrated by means of base station entities 150). According to such a preferred embodiment of the telecommunications network 100 comprising a fixed line part and a mobile (or cellular) part, it is provided for the user equipment or client devices 51, 52 being able to use different access technologies. However, according to the present invention, also a telecommunications network 100 of the "fixed-line-only" type, or a telecommunications network 100 of the "mobile (or cellular)—only" type is possible to be used according to the present invention. The telecommunications network 100 comprises at least one logical or physical central office point of delivery 110 that is preferably realized within a data center and that is handling different access requirements, such as different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50 or via a customer premises equipment functionality that may be built in the client devices 51, 52.

Figure 2:
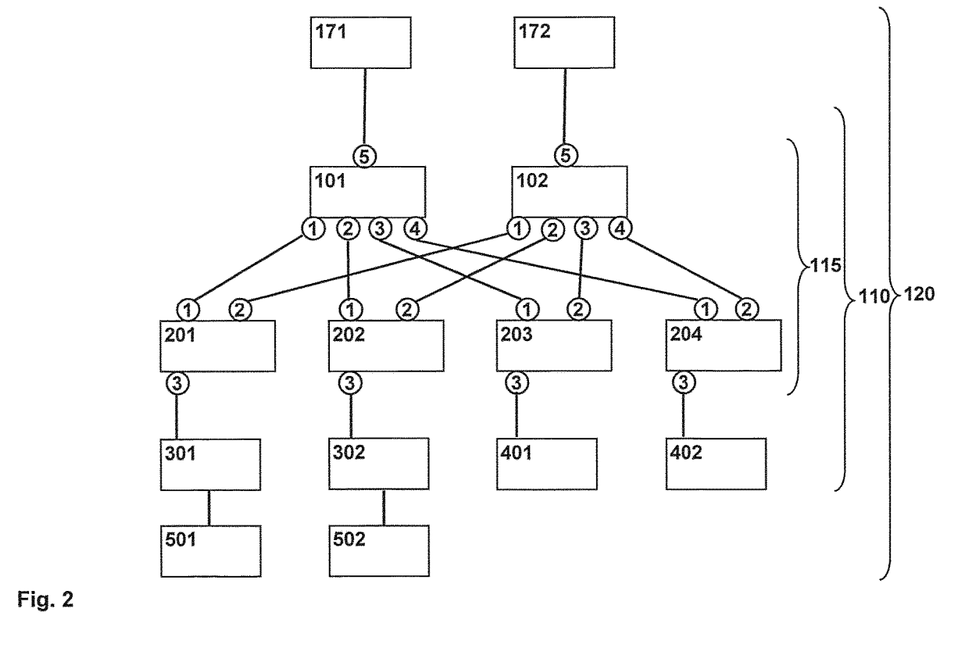
FIGS. 2 and 3 schematically illustrate a part of the telecommunications network, wherein the represented part of the telecommunications network comprises a switching fabric within a logical or physical central office point of delivery, which is part of the broadband access network of the telecommunications network.
Figure 3:
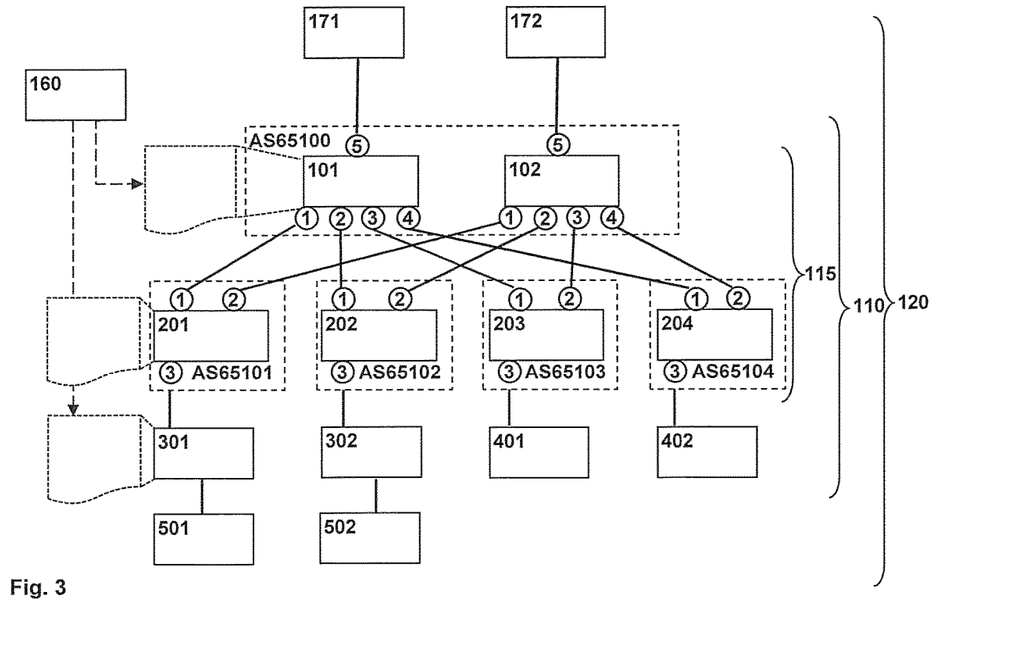

FIGS. 2 and 3 schematically illustrate a part of the telecommunications network 100, wherein the represented part of the telecommunications network 100 comprises a switching fabric 115 within a logical or physical central office point of delivery 110, which itself is part of the broadband access network 120 of the telecommunications network 100. The switching fabric 115 comprises a plurality of spine network nodes 101, 102. In the example represented in FIGS. 2 and 3, the switching fabric 115 comprises two spine network nodes, a first spine network node 101 and a second spine network node 102. Furthermore, the switching fabric 115 comprises a plurality of leaf network nodes 201, 202, 203, 204. In the example represented in FIGS. 2 and 3, the switching fabric 115 comprises four leaf network nodes, a first leaf network node 201, a second leaf network node 202, a third leaf network node 203, and a fourth leaf network node 204. Within the switching fabric 115 each one of the plurality of spine network nodes 101, 102 is connected with each one of the plurality of leaf network nodes 201, 202, 203, 204. In addition, the broadband access network 120 typically comprises a plurality of (label) edge nodes 171, 172, two of which are represented in FIGS. 2 and 3. The spine network nodes 101, 102 are each connected to one of the (label) edge nodes 171, 172; in the example provided in FIGS. 2 and 3, there is a 1:1 relationship between each one of the spine network nodes 101, 102 on the one hand and each one of the (label) edge nodes 171, 172. However, according to the present invention, such a 1:1 relationship is not mandatory. It is preferred according to the present invention to realize that broadband access network such that a group or a plurality of at least two spine network nodes and a group or a plurality of at least two (label) edge nodes are related or assigned to each other, but that the effective connection between a specific spine network node (of the considered group of spine network nodes) and a specific (label) edge node (of the considered group of (label) edge nodes) is dependent on the required transmission capacity in different load conditions of the network.

The central office point of delivery 110 furthermore comprises a plurality of line termination nodes 301, 302, and/or a plurality of service edge nodes 401, 402. In the example represented in FIGS. 2 and 3, the central office point of delivery 110 comprises two line termination nodes, a first line termination node 301 and a second line termination node 302, and two service edge nodes, such as, e.g. BNG nodes (Broadband Network Gateway nodes), a first service edge node 401, and a second service edge node 402. Furthermore, the broadband access network 120 comprises a plurality of remote access nodes 501, 502 such that each one of the plurality of line termination nodes 301, 302 is connected to at least one of the plurality of remote access nodes 501, 502. In the example represented in FIGS. 2 and 3, the broadband access network 120 comprises two remote access nodes, a first remote access node 501, and a second remote access node 502.

The spine network nodes 101, 102 each comprise a certain number of interfaces or ports; in the example represented in FIGS. 2 and 3, each one of the spine network nodes 101, 102 comprises five interfaces or ports, being numbered from 1 to 5 in FIGS. 2 and 3 at each one of the spine network nodes 101, 102; for each spine network node 101, 102, ports 1 to 4 provide a connection to one of the leaf network nodes, i.e. port 1 (respectively of the first or the second spine network node 101, 102) provides the connection to the first line termination node 301, port 2 provides the connection to the second line termination node 302, etc.; for each spine network node 101, 102, port 5 (respectively of the first or the second spine network node 101, 102) provides a connection to one of the (label) edge nodes 171, 172.

Likewise, the leaf network node 201, 202, 203, 204 each comprise a certain number of interfaces or ports; in the example represented in FIGS. 2 and 3, each one of the leaf network node 201, 202, 203, 204 comprises three interfaces or ports, being numbered from 1 to 3 in FIGS. 2 and 3 at each one of the leaf network node 201, 202, 203, 204; for each leaf network node 201, 202, 203, 204 ports 1 and 2 provide a connection to one of the spine network nodes, i.e. port 1 (respectively of the first, second, third or fourth leaf network node 201, 202, 203, 204) provides the connection to the first spine network node 101, port 2 provides the connection to the second spine network node 102; for each leaf network node 201, 202, 203, 204, port 3 (respectively of the first or the second or the third or the fourth leaf network node 201, 202, 203, 204) provides a connection to one of the line termination node 301, 302, and to one of service edge nodes 401, 402.

Figure 4:
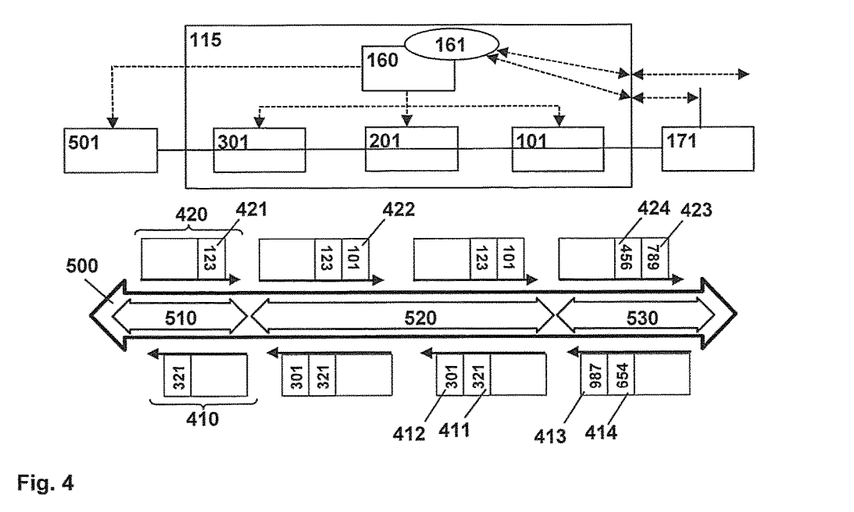
FIG. 4 schematically illustrates and example of a pseudo wire between a remote access node and a termination network node of the pseudo wire.

FIG. 4 schematically illustrates and example of a pseudo wire between a specific remote access node 501 (or the plurality of remote access nodes 501, 502) and a termination network node 171 (of the pseudo wire). The pseudo wire is designated by means of reference sign 500 and comprises a plurality of (in the exemplary embodiment or situation shown in FIG. 4: three) so-called segments: A first segment 510 spans the considered (or specific) remote access node 501 and the considered (or connected) line termination node 301; a second segment 520 spans the considered (or connected) line termination node 301, the leaf network node 201, and the spine network node 101; a third segment 530 spans the spine network node 101 and the termination network node 171. According to the present invention, data packets are transported (or routed) to or from the specific remote access node 501 of the plurality of remote access nodes 501, 502, by using a pseudo wire 500. The pseudo wire 500 spans all the mentioned segments, i.e. according to the example shown in FIG. 4 the first segment 510, the second segment 520, and the third segment 530.

Generally, according to the invention, the pseudo wire 500 spans at least the specific remote access node 501 and the switching fabric 115 (i.e. including the specific remote access node 501, the considered line termination node 301, the leaf network node 201, and the spine network node 101). Two exemplary data packets are schematically illustrated in FIG. 4, a (first, downstream) data packet 410, and a (second, upstream) data packet 420. Both data packets 410, 420 are schematically shown at different stages of their transport through the telecommunications network 100.

Between the specific remote access node 501 and the line termination node 301 (corresponding to the first segment 510 of the pseudo wire 500), a first header label information 411 (reading "321" in the exemplary embodiment of FIG. 4) is used for the (first) data packet 410 (that is received by the specific remote access node 501) and a second header label information 421 (reading "123" in the exemplary embodiment of FIG. 4) is used for the (second) data packet 420 (sent from the specific remote access node 501).

Between the line termination node 301 and the spine network node 101—i.e. within the central office point of delivery and/or across the switching fabric (corresponding to the second segment 520 of the pseudo wire 500)—, a third header label information 412 (reading "301" in the exemplary embodiment of FIG. 4) is used for the (first) data packet 410 and a fourth header label information 422 (reading "101" in the exemplary embodiment of FIG. 4) is used for the (second) data packet 420.

Between the spine network node 101 and the termination network node 171 (corresponding to the third segment 530 of the pseudo wire 500), at least a fifth header label information 413 (reading "987" in the exemplary embodiment of FIG. 4) is used for the (first) data packet 410 and a sixth header label information 423 (reading "789" in the exemplary embodiment of FIG. 4) is used for the (second) data packet 420. Optionally, the use of the pseudo wire 500 additionally comprises using a seventh header label information 414 (reading "654" in the exemplary embodiment of FIG. 4) for the (first) data packet 410 to be received by the specific remote access node 501 and using an eighth header label information 424 (reading "456" in the exemplary embodiment of FIG. 4) for the (second) data packet 420 sent from the specific remote access node 501.

The exemplary situation represented in FIG. 4 shows the case that the termination network node is located outside of the central office point of delivery 110, wherein "located outside of the central office point of delivery 110" either means in the "northbound" direction—i.e. towards a hierarchically higher level such as a label edge router towards the backbone or core network of the telecommunications network 100—, or in the "southbound" direction—i.e. towards a hierarchically lower level such as, e.g., another remote access node (compared to the specific remote access node 501). However, even though this situation is not represented in FIG. 4, it is also possible and preferred according to the present invention that the termination network node is not located outside of the central office point of delivery 110, but inside of the central office point of delivery 110, i.e. the pseudo wire 500 spans the specific remote access node 501, and the switching fabric 115, and the termination network node of the pseudo wire 500 is within the central office point of delivery 110.

Furthermore according to the present invention, the broadband access network 120, or the central office point of delivery 110 or the switching fabric 115, comprises a controller node 160 and/or a virtual router instance 161 (which may be on the controller node 160), wherein the generation and/or the establishment of the pseudo wire 500 is controlled by the controller node 160 and/or by the virtual router instance 161. The method may comprise a first step such that, in case that the (first) data packet 410 is to be received by the specific remote access node 501, the controller node 160 and/or the virtual router instance 161 assigns the first header label information 411 and/or the third header label information 412 to the pseudo wire 500, and in case that the (second) data packet 420 is to be sent from the specific remote access node 501, the controller node 160 and/or the virtual router instance 161 assigns the second header label information 421 and/or the fourth header label information 422 to the second segment 520 of the pseudo wire 500. In a second step, subsequent to the first step, the (first) data packet 410 is received by the specific remote access node 501 or the (second) data packet 420 is sent from the specific remote access node (501).

According to the present invention, MPLS (Multiprotocol Label Switching) segment routing is used to forward data packets across the switching fabric. In segment routing, there are two different kinds of MPLS labels known as segment identifiers (SID):

Prefix SID which represents an IP prefix (or subnet) and is unique within the switching fabric; the node SID is a special prefix SID which represents the node itself (i.e. the loopback prefix), Adjacency SID (adj-SID) which represents a link and is only locally significant to the node attached to the link.

In order to provide MPLS transport between any two nodes within the switching fabric, a label switched path (LSP) needs to be set up. With segment routing, the nodes within the switching fabric only need to know the node SID of all other nodes to establish LSPs to any potential destination. As the node SID is unique, pushing the node SID on top of a packet results in forwarding the packet through the switching fabric until it reaches the destination node. The destination node removes (pops) the node SID and inspects the remaining packet.

According to the present invention, an overlay of the switching fabric is provided by using the pseudo wire 500 (or by using a plurality of such pseudo wires). The pseudo wire overlays may be used for subscriber traffic between line termination nodes (such as OLTs) and the service edge (of different central office points of delivery), or service edge nodes, i.e. in order to transport frames from the line termination nodes (or OLTs) to the (virtual) BNG (Broadband Network Gateway) and in order to avoid scaling issues with VLAN stacking. A pseudo wire provides a transparent layer connection between two endpoints. The pseudo wire terminates for example on the line termination node (e.g. an OLT) and the (v)BNG itself (or even multiple pseudo wires; each per access port) and is represented by a pseudo wire label (i.e. the fifth to eighth header label information) which is only known to the endpoints. There is an N:M mapping between line termination nodes (or OLTs) and (v)BNGs, i.e. the pseudo wires, per node or per access node port, configured on a single line termination node typically terminate on multiple (v)BNG-nodes (this can be done either physically or logically or in a grouped manner). If a line termination node receives a frame (or a data packet) from the PON tree (passive optical network tree), it maps the VID (access port) to a pseudowire and pushes the pseudowire label on top of the packet. In addition—depending on the remote pseudo wire termination point (i.e. the termination network node)—it also pushes a prefix SID label representing the (v)BNG and forwards the packet to the leaf switch. Because the line termination node (or OLT) should not participate in dynamic signaling, the prefix SID labels to reach nodes within the central office point of delivery 110 as well as the pseudo wire service label are configured via a southbound API by a controller instance (i.e. the controller node 160 and/or the virtual router instance 161). The leaf network node processes the topmost label which is the prefix SID label for the destination node. Based on this label, the frame (or data packet) is either locally switched (in case the vBNG is connected to the same leaf switch as the line termination node) or usually forwarded to one of the spine switches. As there are two spine network nodes with ECMP paths to the destination, the frames (or data packets) are load-balanced based on some kind of hashing. Similar to the ingress leaf network node, the spine network node and egress leaf network node will forward the data packet based on the topmost node SID label which remains unchanged. The (v)BNG pops the node SID label which represents itself and processes the PW label. It decapsulates the PPPoE frame executes the subscriber specific operations.

It is advantageous that there is no restriction in switch ports within the central office point of delivery 110, i.e. the same dataplane can be used to hand over wholesale traffic to another internet service provider on a port on the spine network node as every switching fabric network node has a unique node label and therefore qualifies as a termination point for the pseudo wire.

For some applications, e.g., wholesale or business access, it may be necessary to setup a pseudo wire between the line termination node (or OLT) and a network node which is outside the central office point of delivery. As the line termination node should not be included in dynamic routing and signaling, a "pseudo wire proxy" running on the spine network node is introduced. The pseudo wire proxy re-uses the concept of multisegment pseudo wire described in RFC5659—where the pseudo wire proxy is called a pseudo wire switching provider edge (PW S-PE). As in the previous case, relevant frames arriving on the line termination node (or OLT) from a PON tree are matched and two labels are pushed on top of the frame, the inner label representing the pseudo wire label and outer label representing the destination which is the one of the spine network node. According to an alternative embodiment of the present invention, a kind of anycast label is used for both spine network nodes, which means that nodes within the central office point of delivery 110 that connecting to the outside world can use any of the spine network nodes because they have the same forwarding table. This concept helps to move the service from one spine network node to another in case of node or link failure. As the line termination node (or OLT) does not take part in dynamic signaling, a virtual routing process performs the signaling with the remote pseudo wire termination point. It therefore uses eBGP-LU to establish a transport path to the remote device and in addition uses LDP or BGP to signal the pseudo wire. The spine network node acts as a pseudo wire switching device, i.e. it has to swap the pseudo wire label which was pushed by the line termination node (or OLT) to the pseudo wire label learned from the remote pseudo wire termination point. In addition, it has to push the transport label towards the backbone forwarding the frame to the connected label edge router. The pseudo wire label used to communicate within the central office point of delivery 110 is configured by the controller node 160.

According to the present invention, the pseudo wires 500 span also the remote access node (or MSAN device) to the line termination node, i.e. the remote access node is a termination point of the pseudo wires 500. The basic concept is to use a multi-segment pseudowire 500 with the above mentioned three segments.

For the sake of simplicity, the routing process exchanging information with the backbone is hosted on the controller. Without limiting the basic concept, it can be moved to the spine switch if necessary.

On the (v)BNG, the IP packet resulting from PPP session termination needs to be forwarded to the IP backbone. In the simplest way, this is done via two default routes pointing towards the spine switches.

Therefore, the (v)BNG pushes two labels on top of the IP packets and forwards those packets to the leaf switch it is connected to. The outer MPLS label represents the prefix SID of the egress spine switch, while the inner label represents the routing context (e.g. the global IP routing table). In this document this label is called the table ID label (TID). In general, the inner label can also be used to represent a specific VPN context. The leaf switch only processes the topmost label and forwards the frame to one of the spine switches.

The spine switch pops the topmost label because it is its own node SID label and performs a lookup on the second label (TID label). The TID label represents the uplink to the IP backbone, i.e. in the simplest case there is only one TID label which corresponds to the uplink interface. If there are multiple uplink interfaces, multiple different TID labels may be used for TE purposes. In case MPLS L3VPNs are implemented on the POD, additional TID labels may be allocated to the different L3VPNs. In this scenario, it may be necessary not only to pop the TID label but also to rewrite the frame header with a VLAN ID.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced use of a switching fabric within a central office point of delivery of a broadband access network of a telecommunications network, wherein the switching fabric comprises a plurality of spine network nodes and a plurality of leaf network nodes, wherein—within the switching fabric—each one of the plurality of spine network nodes is connected with each one of the plurality of leaf network nodes, wherein the central office point of delivery further comprises a plurality of line termination nodes, and wherein the broadband access network comprises a plurality of remote access nodes such that each one of the plurality of line termination nodes is connected to at least one of the plurality of remote access nodes, wherein the telecommunications network furthermore comprises a plurality of edge nodes such that each one of the plurality of spine network nodes is connected to at least one of the plurality of edge nodes, wherein the method comprises:

transporting data packets to and from a specific remote access node of the plurality of remote access nodes using a pseudo wire, wherein the pseudo wire spans at least the specific remote access node and the switching fabric, wherein the pseudo wire comprises a first segment extending from the specific remote access node to a line termination node of the plurality of line termination nodes, a second segment from the line termination node to a spine network node of the plurality of spine network nodes, and a third segment from the spine network node to a termination point outside of the central office point of delivery;

wherein transporting a first data packet to the specific remote access node using the pseudo wire comprises:

receiving, by the spine network node, the first data packet from the termination point via the third segment, wherein the first data packet received by the spine network node via the third segment comprises seventh header label information;

removing, by the spine network node, the seventh header label information from the first data packet and adding first and third header label information to the first data packet, wherein the third header label information is for multi-protocol label switching (MPLS);

receiving, by the line termination node, the first data packet from the spine network node via the second segment;

removing, by the line termination node, the third header label information from the first data packet; and receiving, by the specific remote access node, the first data packet from the line termination node via the first segment; and wherein transporting a second data packet from the specific remote access node using the pseudo wire comprises:

receiving, by the line termination node, the second data packet from the specific remote access node via the first segment, wherein the second data packet received by the line termination node via the first segment comprises second header label information;

adding, by the line termination node, fourth header label information to the second data packet, wherein the fourth header label information is for MPLS;

receiving, by the spine network node, the second data packet from the line termination node via the second segment;

removing, by the spine network node, the fourth header label information from the second data packet and adding eighth header label information to the second data packet; and receiving, by the termination point, the second data packet from the spine network node via the third segment.

2. The method according to claim 1, wherein the first data packet received by the spine network node via the third segment further comprises fifth header label information;

wherein the second data packet received by the termination node further comprises sixth header label information.

3. The method according to claim 1, wherein the broadband access network comprises a controller node and/or a virtual router instance configured to assign the first header label information and/or the third header label information to the pseudo wire, and to assign the second header label information and/or the fourth header label information to the pseudo wire.

4. The method according to claim 3, wherein the controller node and/or the virtual router instance is hosted by one or more spine network nodes.

5. The method according to claim 1, wherein segment identifiers are used as the third and fourth header label information within the switching fabric, wherein the segment identifiers are unique identifiers within the switching fabric.

6. The method according to claim 1, wherein the pseudo wire provides a transparent layer connection between the specific remote access node and the termination point outside of the central office point of delivery.

7. A telecommunications network, comprising:

a switching fabric within a central office point of delivery of a broadband access network of the telecommunications network, wherein the switching fabric comprises a plurality of spine network nodes and a plurality of leaf network nodes;

wherein—within the switching fabric—each one of the plurality of spine network nodes is connected with each one of the plurality of leaf network nodes;

wherein the central office point of delivery further comprises a plurality of line termination nodes, and wherein the broadband access network comprises a plurality of remote access nodes such that each one of the plurality of line termination nodes is connected to at least one of the plurality of remote access nodes;

wherein the telecommunications network further comprises a plurality of edge nodes such that each one of the plurality of spine network nodes is connected to at least one of the plurality of edge nodes;

wherein the telecommunications network is configured such that, in order to transport data packets to and from a specific remote access node of the plurality of remote access nodes, a pseudo wire is used, spanning at least the specific remote access node and the switching fabric, wherein the pseudo wire comprises a first segment extending from the specific remote access node to a line termination node of the plurality of line termination nodes, a second segment from the line termination node to a spine network node of the plurality of spine network nodes, and a third segment from the spine network node to a termination point outside of the central office point of delivery;

wherein transporting a first data packet to the specific remote access node using the pseudo wire comprises:

receiving, by the spine network node, the first data packet from the termination point via the third segment, wherein the first data packet received by the spine network node via the third segment comprises seventh header label information;

removing, by the spine network node, the seventh header label information from the first data packet and adding first and third header label information to the first data packet, wherein the third header label information is for multi-protocol label switching (MPLS);

receiving, by the line termination node, the first data packet from the spine network node via the second segment;

removing, by the line termination node, the third header label information from the first data packet; and receiving, by the specific remote access node, the first data packet from the line termination node via the first segment; and wherein transporting a second data packet from the specific remote access node using the pseudo wire comprises:

receiving, by the line termination node, the second data packet from the specific remote access node via the first segment, wherein the second data packet received by the line termination node via the first segment comprises second header label information;

adding, by the line termination node, fourth header label information to the second data packet, wherein the fourth header label information is for MPLS;

receiving, by the spine network node, the second data packet from the line termination node via the second segment;

removing, by the spine network node, the fourth header label information from the second data packet and adding eighth header label information to the second data packet; and receiving, by the termination point, the second data packet from the spine network node via the third segment.

8. One or more non-transitory computer-readable memories having processor-executable instructions stored thereon for enhanced use of a switching fabric within a central office point of delivery of a broadband access network of a telecommunications network, wherein the switching fabric comprises a plurality of spine network nodes and a plurality of leaf network nodes, wherein—within the switching fabric—each one of the plurality of spine network nodes is connected with each one of the plurality of leaf network nodes, wherein the central office point of delivery further comprises a plurality of line termination nodes, and wherein the broadband access network comprises a plurality of remote access nodes such that each one of the plurality of line termination nodes is connected to at least one of the plurality of remote access nodes, wherein the telecommunications network furthermore comprises a plurality of edge nodes such that each one of the plurality of spine network nodes is connected to at least one of the plurality of edge nodes, wherein the processor-executable instructions, when executed, facilitate:

transporting data packets to and from a specific remote access node of the plurality of remote access nodes using a pseudo wire, wherein the pseudo wire spans at least the specific remote access node and the switching fabric, wherein the pseudo wire comprises a first segment extending from the specific remote access node to a line termination node of the plurality of line termination nodes, a second segment from the line termination node to a spine network node of the plurality of spine network nodes, and a third segment from the spine network node to a termination point outside of the central office point of delivery;

wherein transporting a first data packet to the specific remote access node using the pseudo wire comprises:
 receiving, by the spine network node, the first data packet from the termination point via the third segment, wherein the first data packet received by the spine network node via the third segment comprises seventh header label information;
 removing, by the spine network node, the seventh header label information from the first data packet and adding first and third header label information to the first data packet, wherein the third header label information is for multi-protocol label switching (MPLS);
 receiving, by the line termination node, the first data packet from the spine network node via the second segment;
 removing, by the line termination node, the third header label information from the first data packet; and
 receiving, by the specific remote access node, the first data packet from the line termination node via the first segment; and wherein transporting a second data packet from the specific remote access node using the pseudo wire comprises:
 receiving, by the line termination node, the second data packet from the specific remote access node via the first segment, wherein the second data packet received by the line termination node via the first segment comprises second header label information;
 adding, by the line termination node, fourth header label information to the second data packet, wherein the fourth header label information is for MPLS;
 receiving, by the spine network node, the second data packet from the line termination node via the second segment;
 removing, by the spine network node, the fourth header label information from the second data packet and adding eighth header label information to the second data packet; and
 receiving, by the termination point, the second data packet from the spine network node via the third segment.

* * * * *